UNITED STATES PATENT OFFICE.

HORACE L. BOWKER, OF BOSTON, MASSACHUSETTS.

IMPROVEMENT IN SIRUPS AND MINERAL WATERS, &c.

Specification forming part of Letters Patent No. 193,476, dated July 24, 1877; application filed July 7, 1877.

*To all whom it may concern:*

Be it known that I, HORACE L. BOWKER, of Boston, in the county of Suffolk and State of Massachusetts, have invented certain new and useful Improvements in Sirups and Mineral Waters, &c.; and I do hereby declare that the following is a full, clear, and exact description thereof, which will enable others skilled in the art to which it appertains to make and use the same.

My invention relates to improvements in sirups, mineral waters, ciders, beers, ales, or in any and all liquids containing carbonic-acid gas, whether natural or artificial, for the purpose of creating and sustaining a sparkling, frothy foam or head on the drink when drawn from the bottle or fountain, &c., or in whatever manner drawn; and this my invention consists in combining with sirups, mineral waters, or drinks, as aforesaid, a small quantity of saponin extracts produced from any vegetable matters containing saponin—such as, for instance, "soap-bark" from the *Quillaya saponaria* tree, the root and leaves of "soap-wort," (*Saponaria officinalis*,) seneca or snake-root, and of the various species of smilax, or other vegetable products containing saponin, as aforesaid.

The saponin extract may be obtained from the vegetable products containing the same by soaking, steeping, or boiling such products in water, alcohol, ethers, or any other menstruum or process, by which the saponin properties are extracted. This liquid extract of saponin is or may be separated and prepared by any other convenient process, and is afterward filtered and strained, and is then ready to be mixed with the sirup, mineral waters, and aerated liquors, &c. This gum or liquid containing saponin, when mixed in small quantities with sirups, mineral waters, liquors, &c., as above-named, produces a very beautiful sparkling, frothy foam or head on the drink, and, what is still better, this foam remains on the drink for quite a long time, so that the carbonic-acid gas in the drink is prevented from escaping, and thereby retains the vivacity and invigorating properties of the drink a long time after it is drawn.

Where soda-water or ginger-ale is drawn, it fills the glass with a beautiful cream-like foam, which remains for a long time. It is also excellent in small-beer, for champagne-cider, and in all preparations where carbonic-acid gas exists, either fermented, charged, natural, or artificial.

This saponin gum is very pure and wholesome, will not hurt or spoil or make any liquid morbid or cloudy, whether used in large or small quantities. It has also the tendency to preserve beer and sirups from souring.

The advantage of the froth and foam produced by this mixture of saponin extract with the drinks, as aforesaid, is not merely to please the eye, but it tends to hold the carbonic-acid gas a long while in the liquid after it is drawn, which makes the drink taste more palatable and pleasant.

Where this saponin extract is used, the soda-water, ginger-ale, or whatever it is used in, need not be charged as high by 20° to produce the same effect, by which a great saving is made to parties who charge liquids or drinks with carbonic-acid gas. The chief merit of combining this saponin extract with sirups, mineral waters, &c., is that it prevents the carbonic-acid gas from escaping from the tumbler, and, as is well known, when soda-water, beers, &c., are drawn in an open tumbler, the gas escapes so rapidly that unless it is drunk instantly it is flat and worthless.

Having thus fully described my invention, I wish to secure by Letters Patent, and claim—

The combination of saponin extracted from vegetable products with sirups, mineral waters, ciders, beers, ales, &c., or other liquids containing carbonic-acid gas, whether natural or artificial, as and for the purpose herein set forth and described.

In testimony that I claim the foregoing as my own invention I have affixed my signature in presence of two witnesses.

HORACE L. BOWKER.

Witnesses:
ALBAN ANDRÉN,
HENRY CHADBOURN.